C. J. TRUCANO.
INSULATING SYSTEM.
APPLICATION FILED OCT. 19, 1914.

1,140,633.

Patented May 25, 1915.

WITNESSES:
Frank H. Fowler
Winifred Knoph

INVENTOR
Charles J. Trucano
BY Fred P. Ginn
ATTORNEY

UNITED STATES PATENT OFFICE.

CHARLES J. TRUCANO, OF CLE ELUM, WASHINGTON.

INSULATING SYSTEM.

1,140,633.  Specification of Letters Patent.  Patented May 25, 1915.

Application filed October 19, 1914. Serial No. 867,465.

*To all whom it may concern:*

Be it known that I, CHARLES J. TRUCANO, a citizen of the United States, and residing at Cle Elum, in the county of Kittitas and State of Washington, have invented certain new and useful Improvements in Insulating Systems, of which the following is a specification.

My invention relates to insulating systems of the vacuum type, and has for its principal objects to provide an insulation which may be applied to pipes or the like in such a way that said insulation does not interfere with the coupling or joining of one pipe to another in the usual manner. Therefore, it is possible to vacuumize the insulation in the process of manufacture of insulated pipes, leaving only the joints or coupling to be insulated at the time of installing the pipe. Simple means for so doing are also provided.

A further object is to provide means for making tight joints in the insulation couplings and for extracting the air from said couplings.

Other objects will appear as my invention is more fully described in the following specification, illustrated in the accompanying drawings and pointed out in the appended claim.

Figure 1:
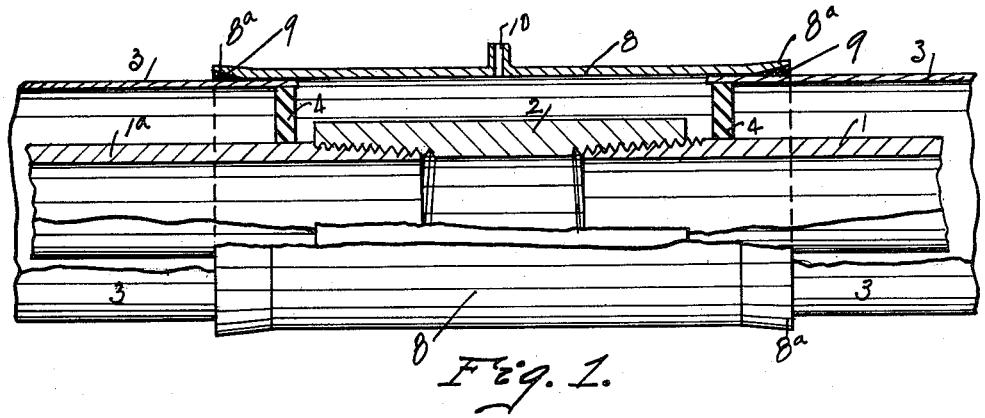
Figure 2:
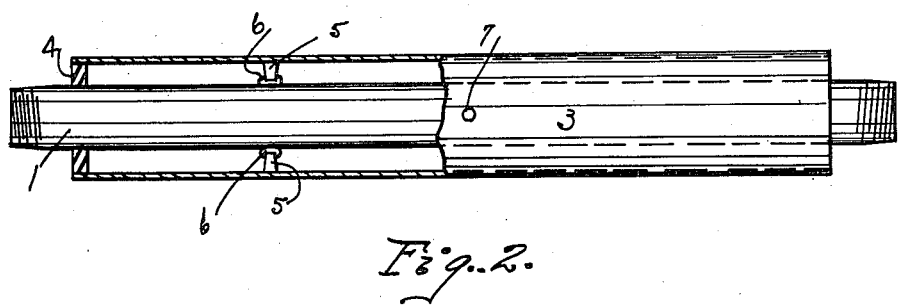

In the drawings, Figure 1 is a part sectional elevation of two sections of insulated pipe joined together by an insulation coupling. Fig. 2 is a part sectional elevation of a length of insulated pipe.

Referring now more particularly to the drawings in which numerals 1 and 1ª designate pipes of the usual kind which are joined together by a coupling 2 in the usual manner. Pipes 1 and 1ª are incased, to within a short distance of their ends, by casing 3. The space between the pipe and the casing is stopped at the ends of said casing 3 by means of insulation washers 4 which make air tight joints between said pipe and casing. Other such washers may be placed along the pipe at various intervals, between the said end washers if desired. Casings 3 are provided with spacing lugs 5 located between washers 4. Lugs 5 are integral with casing 3 and are tipped with insulated contact points 6 which bear against the pipe 1 as shown in Fig. 2. The inclosed air between pipe 1 and casing 3 is extracted through a small outlet 7 which is then closed by any convenient means. The lugs 5 assist in preventing the casing 3 from collapsing under an external pressure.

When it is desired to join together two or more lengths of pipe which are insulated as above described, they are connected by a coupling 2 as shown in Fig. 1, an insulation coupling 8 first having been shoved over the casing 3 of one of the pipes. After the pipes have been joined together, the insulation coupling 8 is moved over the joint as shown in Fig. 1. It will be noted that the insulation coupling has flared ends 8ª, thus leaving a calking space between insulation coupling and the casing into which any convenient form of calking 9 may be driven thereby, making an air tight joint. The impounded air in the insulation coupling is now extracted through an outlet 10 which is then sealed to maintain a partial vacuum within said coupling.

While it is a well known fact that vacuumized space forms an excellent insulation against heat transmission, yet it is not believed that heretofore any cheap and convenient method of applying this principle to use in connection with piping systems has been devised.

While I have shown an exact form and method of applying my insulating system, yet many minor changes in the same will suggest themselves to one skilled in the art. I therefore, do not wish to be limited to the exact form and method shown.

What I claim as new, and desire to protect by Letters Patent, is—

In an insulating system for pipes, the combination of an exterior covering for each pipe section, said covering being continuous and shorter than the section so as to allow each end of the section to project beyond each end of the covering, insulating washers interposed at the ends of each covering in air tight relation between the pipe section and its covering, there being an outlet in the covering which is adapted to be closed after the air is extracted from between the pipe and its covering, lugs integral with the covering and which project inwardly along the interior of the same and interposed along the covering between the insulating washers, attachable insulating tips upon the ends of the lugs, whereby the pipe section is maintained concentrically with its covering and yet insulated therefrom, a coupling for the projecting ends of the pipe sections, and an insulating coupling adapted to be slipped over the ends of each of the coverings which are nearest each other, there being an outlet in the said insulating coupling and the ends of the said coupling being outwardly flared to receive calking material.

CHARLES J. TRUCANO.

Witnesses:
FRED P. GORIN,
ROBERT A. WILCOX.